United States Patent [19]

Caster et al.

[11] 4,143,448
[45] Mar. 13, 1979

[54] METHOD AND APPARATUS FOR MANUFACTURING SOLAR HEATER PANELS

[75] Inventors: Terrence R. Caster; Laurance W. Burry, both of San Diego, Calif.

[73] Assignee: Energy Systems, Inc., San Diego, Calif.

[21] Appl. No.: 852,689

[22] Filed: Nov. 18, 1977

[51] Int. Cl.$^2$ .................. B23P 15/26; B23P 19/04
[52] U.S. Cl. .................. 29/157.3 C; 29/450; 29/252; 29/726; 254/93 HP; 269/22; 269/315; 269/321 N
[58] Field of Search .............. 29/157.3 C, 450, 454, 29/252, 727, 726; 113/118 C; 254/93 HP; 269/22, 321 N, 315, 303

[56] References Cited

U.S. PATENT DOCUMENTS

| | | | |
|---|---|---|---|
| 866,782 | 9/1907 | Geisendorfer | 269/303 |
| 1,829,180 | 10/1931 | Bailey et al. | 269/22 |
| 2,382,958 | 8/1945 | Burgoine et al. | 269/22 |
| 2,416,782 | 3/1947 | Valish | 269/321 N |
| 2,558,345 | 6/1951 | Dickman | 29/157.3 C |
| 2,687,626 | 8/1954 | Bartlowe | 29/157.3 C |
| 3,237,252 | 3/1966 | Ratcliffe | 269/22 |
| 3,691,266 | 9/1972 | Greenberg | 269/22 |
| 3,994,484 | 11/1976 | Schorr | 269/315 |
| 4,022,454 | 5/1977 | Bredvik | 269/315 |
| 4,074,897 | 2/1978 | Behn | 269/321 N |

Primary Examiner—C. W. Lanham
Assistant Examiner—Daniel C. Crane
Attorney, Agent, or Firm—Frank D. Gilliam

[57] ABSTRACT

A method and apparatus for assembling a fluid conducting tubular member into secure engagement with a channel integral with an elongated solar heat absorbing plate. The apparatus includes an elongated inflatable tube secured to an upstanding wall fastened to a table top. A fixture having a shallow V-shaped concave face is mounted on said table top with the concave face adjacent and parallel to said tube. An elongated plate having a channel parallel with the longer plate edges is positioned between the tube and the fixture with the channel opening toward the fixture. When the tube is inflated, it presses the plate toward the concave fixture surface. Plate edges contact and are restrained by the fixture edges, while the center of the plate is free to move further toward the fixture, flexing the plate in a manner increasing the diameter of the channel. A tubular member having an outside diameter equal to or greater than the unflexed channel diameter is inserted into the channel. When the tube is deflated, the plate returns to the unflexed state. The tubular member is thus firmly held in the channel, providing a rigid and secure assembly, with excellent heat transfer characteristics.

6 Claims, 9 Drawing Figures

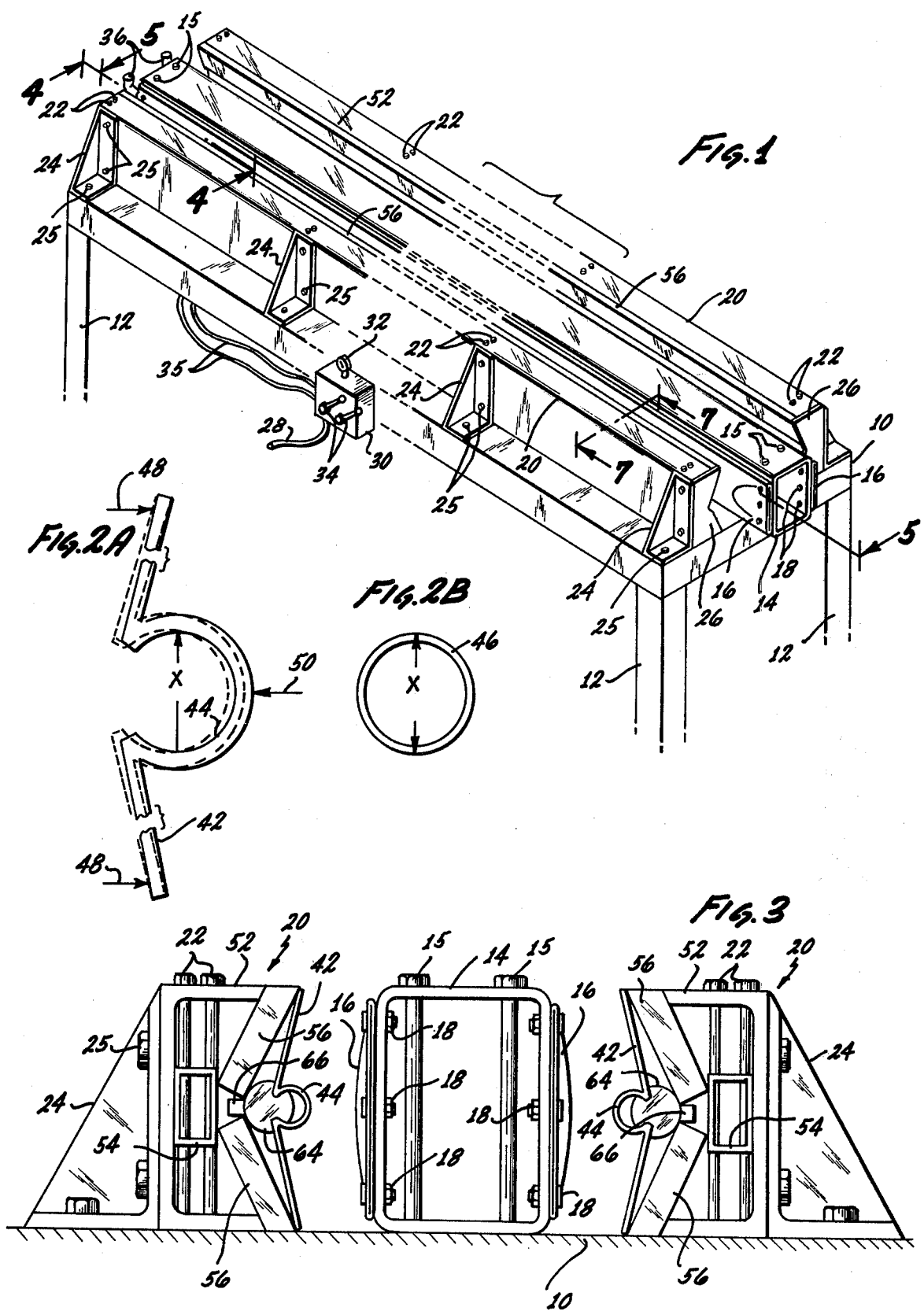

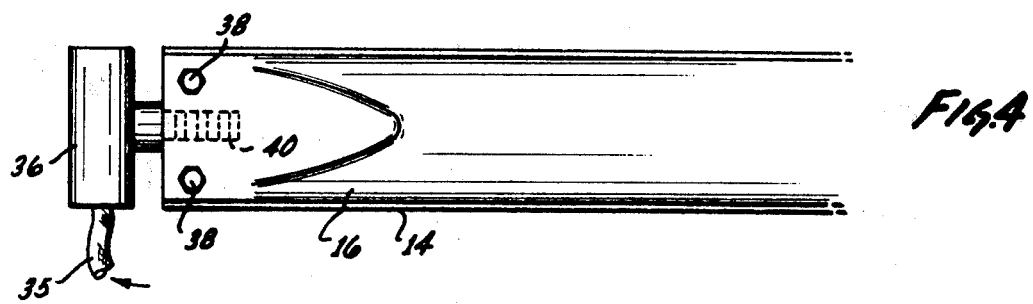
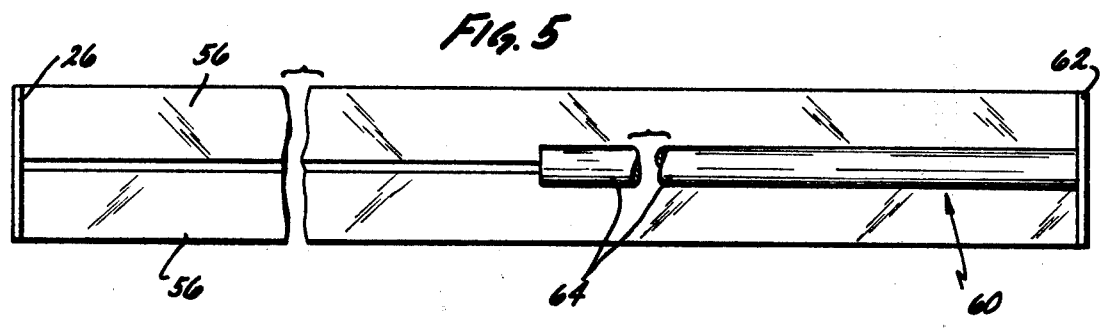
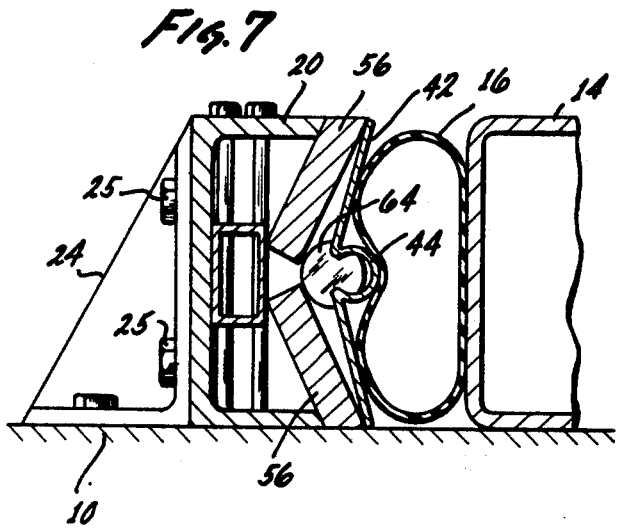
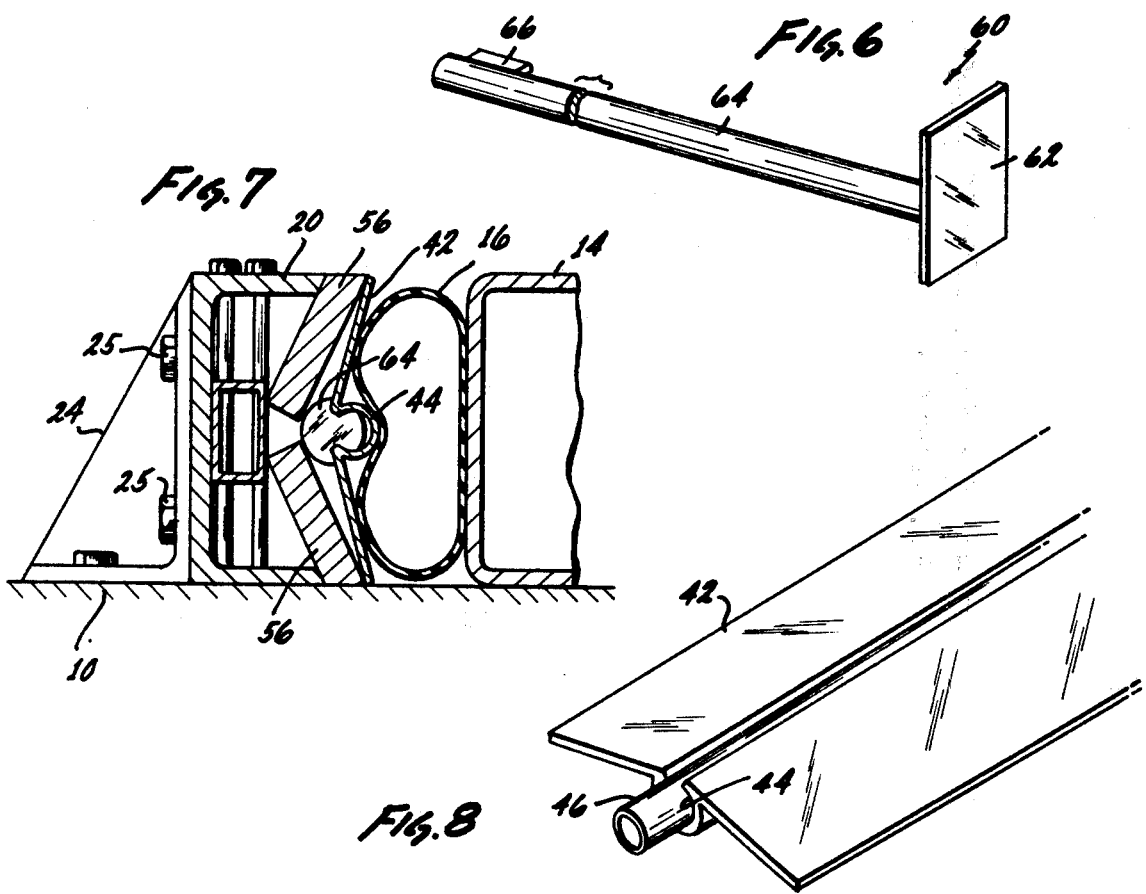
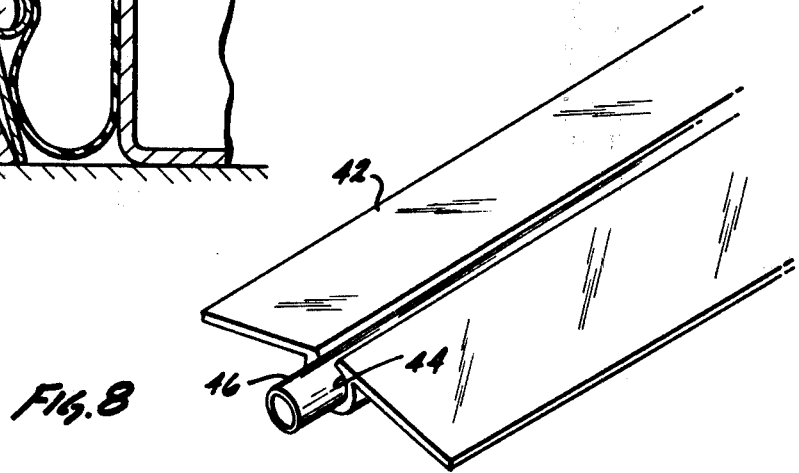

METHOD AND APPARATUS FOR MANUFACTURING SOLAR HEATER PANELS

BACKGROUND OF THE INVENTION

This invention relates in general to solar energy hearing equipment and, more specifically, to a method and apparatus for manufacturing solar heater panels for use in such equipment.

Many different types of solar energy collecting systems have been devised, with a variety of means for conducting the collected heat into a working fluid. One system which has been found to be very effective is described in U.S. Pat. No. 4,011,856, assigned to the assignee of this application. The system disclosed by that patent uses solar heating panels consisting of elongated plates, each having a channel along the plate centerline into which is secured a fluid carrying tubular member. Solar radiation falling on the plates is absorbed and conducted to the tubular members, and then to a working fluid flowing through the tubular members. For efficient operation, the tubular members must be securely held in the channels, with the inner surfaces of the channels and the outer surfaces of the tubular members in tight contact for good conductive heat transfer.

Many methods and apparatuses have been developed for fastening plates or fins to tubes for use in heat exchangers or other devices. Often, tubes are welded, soldered or brazed to plates or fins. Thin walled tubes are often damaged during welding or forming operations required in these methods. Also, these methods tend to produce relatively small contact areas between plate and tube.

Sandberg, in his U.S. Pat. Nos. 2,585,043 and 2,666,981, presses tubes into shallow grooves in metal sheets, forcing the tube into the sheet to form a tube holding channel. The apparatus required to do this is complex, cumbersome and slow. Also, since this technique requires the tube to act as the sheet deforming tool, the tube is likely to be deformed, damaged or cracked during the forming operation. Even with heavy walled tubes and thin sheets there is substantial risk of damage to the tubes. The Sandberg method and apparatus is not suitable for use with a combination of thin walled tubes and thick plates of the sort used in solar heater panels.

These prior methods and apparatus for forming finned tubes are generally incapable of manufacturing solar heating panels which require the use of relatively thick fins and thin tubes with large areas of physical contact between fin and tube. Thus, there is a continuing need for improved methods and apparatuses for manufacturing solar heating panels.

SUMMARY OF THE INVENTION

The problems noted above, and others, are overcome by our apparatus and method for rapidly inserting a tubular member into a channel formed in an elongated plate. Basically, the apparatus comprises an elongated inflatable tube secured along an upstanding wall running along a table surface, with a fixture adjacent to the tube having a concave, shallow V-shaped, face parallel to and slightly spaced from said table. An elongated plate having a generally cross-section channel parallel to one of the longer plate edges, is placed between tube and fixture with the opening of the channel toward the fixture. When the tube is inflated, it presses against the plate, bringing plate edges into restraining contact with the fixture. Since the center of the plate remains free to move further, it is flexed slightly, increasing the diameter of the channel. A tubular member having an outside diameter equal to or slightly greater than the unflexed channel diameter may then be easily inserted into the channel. Upon deflation of the tube, plate elasticity returns the channel to its original diameter, tightly engaging the tubular member around a large part of its circumference.

BRIEF DESCRIPTION OF THE DRAWING

Details of the invention, and of a preferred embodiment thereof, will be further understood upon reference to the drawing, wherein:

FIG. 1 is a perspective view, partially cut-away, of the panel assembly apparatus of this invention;

FIGS. 2A and 2B are end views of a solar heater plate and tube, illustrating the action of the apparatus on a solar heater plate;

FIG. 3 is an end view of the panel assmebly apparatus;

FIG. 4 is a partial section view taken along line 4—4 in FIG. 1 illustrating the tube inflation means;

FIG. 5 is a partial section view taken along line 5—5 in FIG. 1 illustrating the positioning of the end stop means;

FIG. 6 is a perspective view of the end stop means;

FIG. 7 is a partial section view taken on line 7—7 in FIG. 1 illustrating the apparatus in operation; and FIG. 8 is a partial perspective view of the assembled solar heater panel.

DETAILED DESCRIPTION OF THE INVENTION

Referring now to FIG. 1, there is seen a table top 10, mounted in a conventional manner on a plurality of legs 12. Table top 10 may be of any suitable construction (wood, metal, etc.) providing rigid support to the structures to be fastened thereto.

An elongated wall 14 is secured to table top 10 by any conventional means, such as bolts 15. In the embodiment illustrated, wall 14 is a standard rectangular box section structural member. Two elongated tubes 16 are arranged in flattened condition along the two sides of wall 14. Of course, a single tube 16 could be used along only one side of wall 14, cooperating with one of the pair of cooperating fixtures discussed below. For maximum convenience and highest production rates, the pair of tubes shown is preferred. One end of each tube 16 is sealed, such as by a suitable rubber-based adhesive, and fastened to wall 14 by any conventional means, such as bolts 18. The opposite end of each tube 16 is similarly fastened by bolts 38 to wall 14, as seen in FIG. 4.

Adjacent and parallel to each tube 16 is a fixture 20, secured to table top 10 by any conventional means, such as bolts 22. Knee braces 24 further support fixtures. Bolts 25 fasten knee braces 24 to table top 10 and fixtures 20. As described in further detail below, fixtures 20 have concave, shallow V-shaped, faces opposite tube 16. End caps 26 cover the right ends of fixtures 20 as seen in FIG. 1.

Air for inflating tubes 16 is conducted from a conventional air supply through hose 28 to a control box 30 mounted along the edge of table top 10. A gauge 32 monitors available air pressure. A pair of conventional air valves within box 30 are operated by three-position control knobs 34 to control admission of air to tubes 16 through hoses 35 and connectors 36. The air valves (not shown) within box 30 are movable between an "off" or closed position in which no air flows through hoses 28 and 35, an "inflate" position in which hose 28 is connected to one or both of hoses 35 and a "deflate" position in which the end of hose 28 is closed but hoses 35 are open to the atmosphere, releasing air in tubes 16 through hoses 35. If desired, box 30 may also enclose convnetional air filters, pressure regulators, air moisture removing means, etc.

As shown in FIG. 4, the end of tubes 16 through which air is admitted are secured to wall 14 by bolts 38, with the end of tube 16 adhesively sealed around a stem 40. Knobs 34 control the air valves described above to admit air into tubes 16 or exhaust air from tubes 16 to the atmosphere.

Tubes 16 may be formed from any suitable material. Typical materials include rubberized fabric materials of the sort used in most fire hoses, reinforced rubber or plastic material, etc. The tube material should be sufficiently strong to resist balooning beyond a fully circular cross-section while being sufficiently flexible or elastic to rapidly deflate when the internal air pressure is released. Since these properties are best found in the rubberized fabrics used in light-weight fire hoses, such materials are preferred for tubes 16.

FIGS. 2A and 2B illustrate the function of the apparatus of this invention. A typical solar heater plate 42 of the type suitable for use in the solar fluid heater shown in U.S. Pat. No. 4,011856 is shown in end view in FIG. 2A. This plate is approximately flat, although the edges of the plate are preferably slightly curved or bent as shown. While for the purposes of this invention plate 42 is referred to as "approximately flat," it should be recognized that the edges of plate 42 may be bent slightly toward the channel side (as seen in FIG. 2A) or, conversely, could be bent slightly in the opposite direction, if desired. The angle selected for the walls of the shallow V-shaped concavity in the face of fixture 20 will depend on the angle of the edges of plate 42. The important factor is that the edges of plate 42 contact the concave fixture face before the central or channeled portion of plate 42 contacts the face. Channel 44 is formed parallel to the longer edges of plate 42. While channel 44 is preferably located along the centerline of plate 42, it can be formed closer to one edge, if desired. While plate 42 can be manufactured in any desired manner, it is preferably formed from aluminum by extrusion. Channel 44 has a circular cross-section with an inside diameter "X". It is necessary to position a thin walled tubular member 46 within channel 44. While tubular member 46 may be made from any material, copper and aluminum are preferred. Very tight, continuous contact between tubular member 46 and channel 44 is very important for optimum heat transfer from plate 42 to tubular member 46. Thus outside diameter "X" of tubular member 46 should be the same or slightly greater than the inside diameter "X" of channel 44. Clearly, the tubular member could not be forced into channel 44, either lengthwise or through the side opening of channel 44 without damage to thin walled tubular member 46 and/or the edges of channel 44. We have found, however, that this assembly step may be easily performed by the apparatus shown in FIG. 1, as discussed in detail below. The key is the ability of this apparatus to restrain movement along the edges of plate 42 in the direction indicated by arrows 48 while moving the central portion of plate 42 with channel 44 by a force applied approximately at arrow 50 to move the central portion of plate 42 from the position shown in solid lines in FIG. 2A to that shown in broken lines. Such movement increases the inside diameter "X" of channel 44 sufficiently to permit tubular member 46 to be easily slid into place from one end of plate 42. As described below, this function of uniformly flexing plate 42 along its entire length is performed by the apparatus of this invention in an efficient and expeditious manner.

While fixtures 20 can be manufactured in any desired manner, such as by machining the fixtures from solid bar stock, the assemblies illustrated in FIG. 3 are preferred for simplicity and accuracy of manufacture and effectiveness in performance. FIG. 3 is an end view of the apparatus of FIG. 1, with end caps 26 removed and a typical solar plate 42 positioned for work. Basically, fixtures 20 each includes a channel member 52 resting on one leg with the opening toward tube 16. A spacer 54 is fastened to the inside base of the channel. Preferably, spacers 54 are rectangular cross-section tubing, welded in place. The thickness of spacers 54 determines the angle of the shallow V-shaped concavity. If plate 42 were more nearly planar, the depth of the concavity could be decreased, while if the edges of plate 42 were at a greater angle, a thinner spacer 54 and a deeper concavity might be desireable. A pair of die bars 56 are secured, such as by welding, to the edges of channel 52 and the surface of spacers 54. While die bars 56 could be installed so as to meet at the center, it is preferred that a narrow gap be maintained as shown, to accept a guide tab as described below.

In most cases, when tubular member 46 is inserted into channel 44, it is necessary that a small portion of tube 46 extend beyond plate 42 for connection to a fluid manifold. Where the length of plate 42 is less than the overall length of the forming device, it is difficult to insert tubular member 46 to the exact distance desired. The tool 60 shown in FIGS. 5 and 6 assures correct positioning of tubular member 46. Tool 60 consists of an end plate 62 with a rod 64 extending perpindicular to the plate and, in some cases, a tab 66 near the end of rod 64. In use, a plate 42 is inserted into the apparatus as shown in FIG. 3, with one end near the end of the apparatus shown to the right in FIG. 1. A tool 60 is inserted into the left end of the apparatus (as seen in FIG. 1). The length of rod 64 is selected so that the end of the rod abuts the end of plate 42 within the apparatus. Rod 64 lies along the concave V-shape as seen in FIGS. 3 and 5. End plate 62 conforms in dimensions substantially to those of an end cap 26, so that when the lower edge of end plate 62 rests on table top 20, rod 64 will be aligned with the gap between die bars 56. While short rods 64 need no support other than end plate 62, longer rods are kept in place much more easily by the addition of tab 66 which rides in the gap between die bars 56 as seen in FIG. 3. Without tab 66 the end of a long rod 66 may sag sufficiently to permit a tubular member 46 to be pushed too far into channel 44.

FIG. 7 shows the apparatus in operation. Knob 34 has been moved to operate the air valve to admit air into tube 16, causing it to expand. The edges of plate 42 are restrained from movement by die bars 56. The area of plate 42 adjacent to channel 44 is not restrained so that the pressure of tube 16 flexes plate 42 to increase the channel diameter. A tubular member 46 can then be inserted until it bears against the end of rod 64. In this example shown in FIG. 7, rod 64 is relatively short and does not have a tab 66. Air is then exhausted from tube 16, allowing the elasticity of plate 42 to return channel 44 to its original diameter, now tightly clamped around tubular member 46, as seen in FIG. 8. The extension of tubular member 46 beyond plate 42 was accurately set by rod 64 when the tubular member 46 was inserted into channel 44.

While for purposes of the above description of a preferred embodiment the cross-sections of channel 44 and tubular member 46 are referred to as circular (said circular cross-sections being preferred), other cross-sectional shapes may be used if desired, so long as the outer shape and dimensions of tubular member 46 conform to the inner shape and dimensions of channel 44.

Although certain specific materials, components and arrangements were detailed in the above description of preferred embodiments, these may be varied within the scope of this disclosure, where suitable. For example, while a preferred embodiment in which two tubes mounted on both sides of a wall cooperate with two concave fixtures, a single set of tube and shaping fixture may be used if desired.

Other applications, variations and ramifications of this invention will occur to those skilled in the art upon reading this disclosure. These are intended to be included within the scope of this invention, as defined in the appended claims.

We claim:

1. Apparatus for assembling solar heater panels, which comprises:

an elongated upstanding wall secured to a table top;

an elongated inflatable tube secured to at least one side of said wall substantially parallel to said table top;

an elongated fixture secured to said table top adjacent to said tube;

said fixture comprising a channel member having two legs and an intermediate base in a generally U-shaped configuration, said channel member positioned with one leg secured to said top and the open side of said channel toward said tube, an elongated spacer member secured to the inside base of said channel substantially along the channel centerline, said spacer having a thickness less than the height of said legs, and a pair of die bars secured to the free edges of said legs and to said spacer bar with a uniform narrow gap between said bars at said spacer, whereby a concave shallow V-shaped face is presented to said tube with a narrow slot along the centerline of said face;

an elongated bar having a plate at one end substantially perpendicular to the centerline of said bar and an outwardly extending tab on said bar, said bar adapted to be inserted along said concave face with said tab extending into said narrow slot and said place in contact with the end of said fixture; and, means to inflate said tube whereby said tube presses any object placed between said tube and said fixture against said face of said fixture.

2. The apparatus according to claim 1 wherein said tube comprises a rubberized fabric hose.

3. The apparatus according to claim 1 wherein two of said tubes are secured to opposite sides of said upstanding wall and two of said fixtures are positioned adjacent to said two tubes.

4. The method of assembling solar heater panels which comprises the steps of:

providing a table top having secured thereto:

(a) an elongated upstanding wall member with an inflatable tube arranged along at least one side of said wall parallel to said table top; and (b) an elongated forming fixture adjacent to said tube, the side of said fixture facing toward said tube having a concave shallow V-shaped surface parallel to said tube;

placing an elongated solar heater plate between said tube and said fixture, said plate being approximately flat with an approximately circular cross-section channel parallel to the longer plate edges, the open side of said channel facing and fixture;

inflating said tube so that said tube presses said plate toward said fixture, whereby said plate is flexed in a manner increasing the diameter of said channel;

inserting a tubular member into said channel from one end of said fixture, said tubular member having a cross-sectional configuration corresponding to said channel and having an outside diameter equal to or slightly larger than the diameter of said channel before flexing;

deflating said tube;

removing the resulting assembly of plate and tubular member from the fixture;

whereby said plate in returning to its unflexed shape causes said channel to tightly hold said tubular member in place.

5. The method according to claim 4 further including the step of inserting a rod of selected length along the concave face of said fixture until an end-plate secured to the end of said rod engages said fixture so that the distance said plate and tubular member can be inserted from the opposite end of said concave face is precisely limited.

6. The method according to claim 5 further including providing an outwardly extending tab near the end of said rod and extending said rod along said concave face with said tab riding in a longitudinal slot in said concave face whereby said rod is supported in place.

* * * * *